United States Patent [19]

Brown et al.

[11] 3,716,789

[45] Feb. 13, 1973

[54] SIGN REDUNDANCY REDUCTION IN DIFFERENTIAL PULSE MODULATION SYSTEMS

[75] Inventors: Earl Franklin Brown, Piscataway, William Kaminski, West Portal, both of N.J.

[73] Assignee: Bell Telephone Laboratories Incorporated, Murray Hill, N.J.

[22] Filed: April 1, 1971

[21] Appl. No.: 130,409

[52] U.S. Cl. ..................325/38 A, 179/15.55, 178/68

[51] Int. Cl. ..................H04l 3/00

[58] Field of Search....325/38 R, 38 A, 38 B; 178/68; 340/347 AD, 347 DD; 179/15.55

[56] References Cited

UNITED STATES PATENTS 2,957,947 10/1960 Bowers ..............325/38 A 3,422,227 1/1969 Brown ..............179/15.55

3,611,350 10/1971 Leibowitz ..............340/347 AD

*Primary Examiner*—Benedict V. Safourek

*Attorney*—R. J. Guenther and E. W. Adams, Jr.

[57] ABSTRACT

A differential pulse code modulation system substantially reduces sign redundancy by transmitting a flag signal only when a change in polarity exists between differential samples. Between the flag signals, only the absolute magnitude of the differential samples is transmitted. In another arrangement, an amplitude word is transmitted after a second flag signal which signifies a change in polarity of a differential sample accompanied by a large amplitude level. The amplitude word operates an expanded scale coding mode which assigns a quantized level to the differential sample that is changed in sign.

6 Claims, 5 Drawing Figures

INVENTORS E. F. BROWN
W. KAMINSKI
BY David P. Kelley
ATTORNEY

SIGN REDUNDANCY REDUCTION IN DIFFERENTIAL PULSE MODULATION SYSTEMS

BACKGROUND OF THE INVENTION

This invention relates to digital transmission systems and, more particularly, to differential pulse code modulation systems in which each quantized sample is described by magnitude and sign.

A great number of techniques have heretofore been proposed for reducing the number of pulses required for transmission through an existing medium of intrinsic limited capacity to reproduce the transmitted intelligence with fidelity at a receiver. In the prior art, one technique is a differential pulse code modulation system in which differential sampling utilizes the previously transmitted differential sample as a prediction to take advantage of the correlations between consecutively transmitted samples within a video signal.

In such an arrangement, a polarity or sign bit is required to indicate the polarity of each binary code word which can contain a maximum number of bits limited to the assigned time slots per word. The presence or absence of these bits provides a combination in each code word which is indicative of a specific amplitude level of a quantized differential sample. The designation of a bit in each code word for sign information limits the number of quantizing levels available to define the amplitude level of a different sample.

For example, in a typical closed circuit television system, such as PICTUREPHONE , the differential samples representing the video image correlate in sign to an extent that sign changes on the average occur at only every fourth differential sample. Each differential sample is represented by a code word which is transmitted and used to generate a single picture element in the video image at the receiver. A sign bit is included in each code word to indicate the polarity or sign of each different sample. An advantage which is obtained by transmitting only sign changes as they occur between the differential samples is that all the bits in the words between sign changes are utilized to describe only the absolute magnitude of the differential samples. Thus, the same absolute magnitude words are used to describe quantized amplitudes of either positive or negative differential samples. In other words, the result of transmitting sign information when it occurs is to increase the quantizing levels available to describe the amplitude of the differential samples with a higher accuracy than before without increasing the transmission capacity.

SUMMARY OF THE INVENTION

In a first illustrative embodiment of the invention, differential samples of an analog signal are applied to an analog-to-digital converter and a polarity detector. The converter quantizes and codes the differential samples into a digital code word, indicative of the absolute magnitude of each sample, while the polarity detector produces an output signal upon the occurrence of a change in polarity between adjacent differential samples. The output signal of the polarity detector controls a gating network to which are applied the digital code words of the converter and a predetermined output word of a flag generator. The output of the flag generator is used as a flag signal to signify a change in polarity between adjacent differential samples. The flag signal or flag word is a predetermined combination of the digital code while the converter uses the remaining possible combinations available in the digital code word to describe absolute magnitudes of differential samples. The gating network passes the output signal of the converter for transmission, except during the activation of the polarity detector. At this time, the coded absolute magnitude words are gated off by the output signal of the polarity detector which controls the gating network and a flag word is transmitted from the flag generator.

The polarity detector output signal is also used to update a polarity memory which maintains a record of the signal polarity. The polarity memory enables a single flag word to be transmitted to signify both positive and negative polarity changes. The substitution of a flag word that contains only polarity information for an absolute magnitude word produces an error in that particular picture element. The nature of the error is such that it does not usually contrast with adjacent picture elements to a large degree and is limited to a single picture element. These are characteristics which tend to make the error almost unnoticeable to a casual viewer.

In a second illustrative embodiment of the present invention, differential samples of an analog source are applied to three analog-to-digital converters and a polarity detector. The first converter quantizes and digitally codes the absolute magnitude of the differential samples. In this embodiment, however, the digitally coded words are applied to a buffer via a gating network which is controlled by the polarity detector and then transmitted from the buffer at a uniform rate. The second converter generates one of two predetermined flag signals or words which are applied to the gating network. The polarity detector causes the gating network to allow transmission of a flag signal in place of the more frequently transmitted absolute magnitude words only when a sign change is detected by the polarity detector. In this case, the two flag words are two combinations that are reserved from the number of combinations available in the digital code. The remaining combinations available in the digital code word are utilized to describe the quantized absolute magnitude of the differential samples.

The first flag word is used to signify a change in polarity, a mode of operation equivalent to the operation of the first embodiment. In a second mode of operation called the expanded scale mode, the second flag word is used to signify a differential sample that is changed in polarity and accompanied by a large amplitude value. The mode of operation followed upon a change in polarity is determined by which one of the two flag signals is produced by the second converter. For the expanded scale mode, the second flag word is detected by a circuit in the transmitter which enables a gate connected to the output of the third converter. The operation of the third converter is delayed one-half of a sampling interval by delayed application of differential samples. The output signal of the third converter is stuffed between the second flag word and the next absolute magnitude code word and read into the buffer. The output of the third converter is a digital code indicative of an expanded scale to minimize a large error that would otherwise be produced by a sign-changed differential sample accompanied by a large amplitude level. Such an error may be objectionable to the visual perception of a viewer, although the error occurs at infrequent intervals. The magnitude words of the transmitter operating in the expanded scale mode are read into the buffer at a nonuniform rate and are transmitted from the buffer at a uniform rate which will cause the transmitted data to extend into the horizontal retrace interval during operation of the expanded scale mode.

A feature of the present invention is an absolute magnitude analog-to-digital converter whose output is applied to a network of gates controlled by a polarity detector to allow the transmission of the converter output except during occurrences of sign changes of the differential sampled analog signal.

Another feature of the present invention is a polarity memory updated by the polarity detector to enable a single flag word from the flag generator to signify both types of polarity changes of the differential samples.

Still another feature of the present invention is the expanded scale analog-to-digital converter which is used to encode amplitude information of differential samples that change sign and are accompanied by a large amplitude level.

These and other features of the present invention will become apparent upon reading the detailed description taken in conjunction with the accompanying drawings.

DETAILED DESCRIPTION

Figure 1:
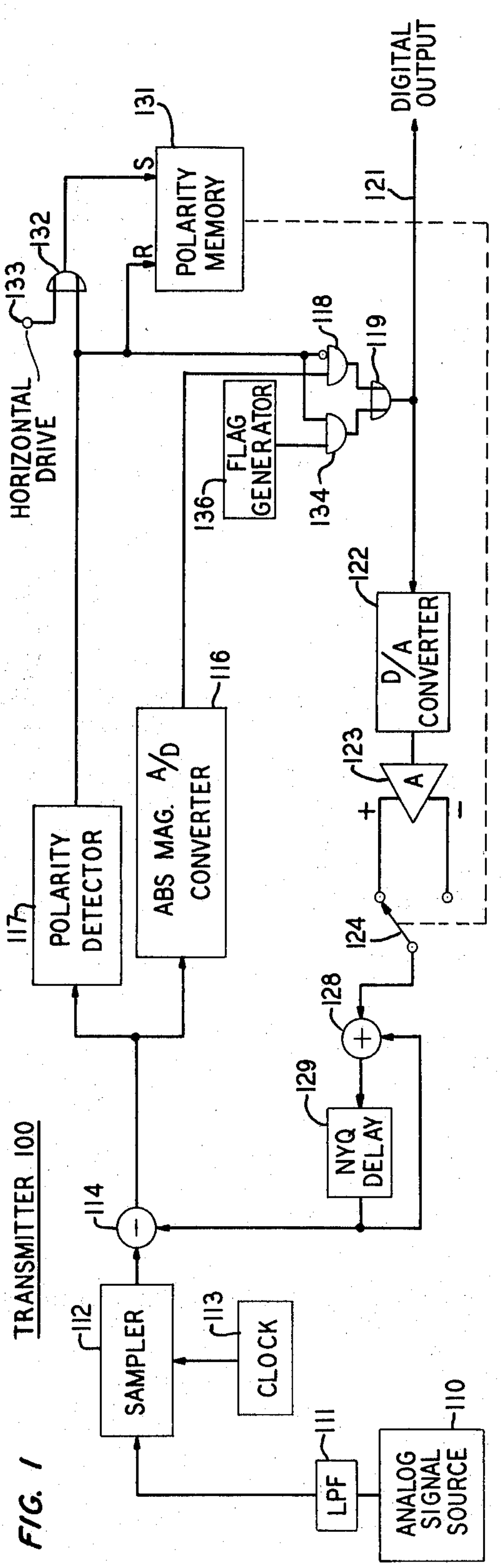
FIG. 1 is a transmitter block diagram of the first illustrative embodiment of the present invention.

FIG. 1 is a block diagram of a transmitter 100 of the first illustrative embodiment of the present invention employing differential pulse code modulation. The analog input signal in this case, a signal representing video information from analog input source 110, is filtered by a low pass filter 111, and then applied to a sampler 112 which is controlled by a clock 113. The clock 113 generates a signal at a frequency which is twice the frequency of the upper cutoff frequency of the low pass filter 111. The rate or frequency of the signal of the clock 113 determines the sampling rate of the sampler 112 which is well known as the Nyquist rate. The output signal of the sampler 112 is an amplitude modulated pulse version of the analog input signal. The pulse amplitude output signal of the sampler 112 is applied to a subtractor 114 which produces an output signal by subtracting a prediction signal obtained from a delay 129. The output signal of the subtractor 114, which is a differential signal divided into samples corresponding to the sampling rate of the sampler 112, is applied to an absolute magnitude analog-to-digital converter 116 and a polarity detector 117.

The differential samples which have the same sign as the previous sample occur more frequently and will be considered first since these samples cause the transmitter 100 to function in a manner that is more typical of the operation of differential pulse code modulation systems which are well known in the art. The output signal of the absolute magnitude analog-to-digital converter 116 is a digital signal which contains binary code words representative of the absolute magnitude of the differential sample signal applied to the converter 116. Each word of the digital signal is a coded signal of the quantized amplitude of a single differential sample applied to the input of the converter 116. The digital output signal of the converter 116 is applied to an AND gate 118 which is normally enabled to allow passage of the signal to OR gate 119. The digital output signal of the OR gate 119 is transmitted from the output terminal 121 through any suitable digital transmission medium.

The digital output signal is also used to obtain the prediction signal through a feedback path to the subtractor 114. The feedback path contains a digital-to-analog converter 122, an amplifier 123, switch 124, an adder 128 and delay 129. The digital-to-analog converter 122 converts the digital signal into quantized positive levels. The analog output signal of the converter 122 is applied to the unity gain amplifier 123. The unity gain amplifier 123 has a noninverted output and an inverted output which are applied to the switch 124. The switch 124 applies either the inverted or the noninverted output signal of the amplifier 123 to the adder 128. The operation of the polarity memory 131 which controls switch 124 will be considered later in conjunction with a discussion of the differential samples that are changed in polarity. The delay 129 has its input connected to the output of the adder 128 and the output of the delay 129 is connected to another input of the adder 128. The delay 129 stores the decoded sum of the previously transmitted digital signals for a period of time equal to the interval between two samples taken at the Nyquist rate. The output signal of the delay 129 is applied to an input of the adder 128 to enable continuous addition to the newly transmitted samples. The output of the delay 129 also provides the prediction signal that is used to obtain the differential samples from the subtractor 114.

The differential samples from the output of the subtractor 114 which are changed in polarity from the previous differential sample shall now be considered. The polarity detector 117 produces an output signal that controls AND gates 118 and 134 and resets the polarity memory 131 through OR gate 132. When a change in polarity is detected by the polarity detector 117, it provides a signal that resets the polarity memory 131, disables AND gate 118 and enables AND gate 134. Gates 118 and 134 cause the digital absolute magnitude signal to be gated off and the flag signal of a flag generator 136 to be transmitted through OR gate 119 to the output terminal 121. The flag signal also causes the converter 122 to provide a zero level signal which is applied to the adder 128. If the polarity detector 117 does not detect a change in polarity between differential samples, it provides a signal that enables AND gate 118 and disables AND gate 134. Gates 118 and 134 then respectively select the digital absolute magnitude signal for transmission and gate off the flag signal.

The analog-to-digital converter 116 can be designed to encode the differential sample into any of the standard digital transmission codes utilized by those skilled in the art. In prior art systems, a standard three-bit per word code can be used to establish four positive and four negative quantizing levels. In the present invention, differential samples are encoded into absolute magnitude words that are not associated with sign or polarity. The present invention is coded such that one word or one combination in a 3-bit per word code is used as a flag signal for changes in polarity and the remaining seven words or combinations of the 3-bit code word are all available to describe the amplitude of either positive or negative differential samples between the transmission of flag words. However, it should be understood that the present invention is not limited to a three-bit code and is equally adaptive to other codes used by those skilled in the art.

The polarity memory 131 can be a simple set-reset type flip-flop which is continuously updated by the output signal of the polarity detector 117. The polarity memory 131 functions to maintain a record of the present polarity of the differential and enables the use of a single flag signal for both positive and negative changes in polarity of the differential samples. The output signal of the polarity memory 131 controls switch 124. The polarity memory 131 is synchronized in the set state by a horizontal drive signal used in the video display format of the input analog signal applied to a terminal 133 of the OR gate 132. At the beginning of each horizontal scan line, the horizontal drive signal synchronizes the polarity memory 131 of the transmitter with a corresponding polarity memory located in a receiver.

Figure 2:
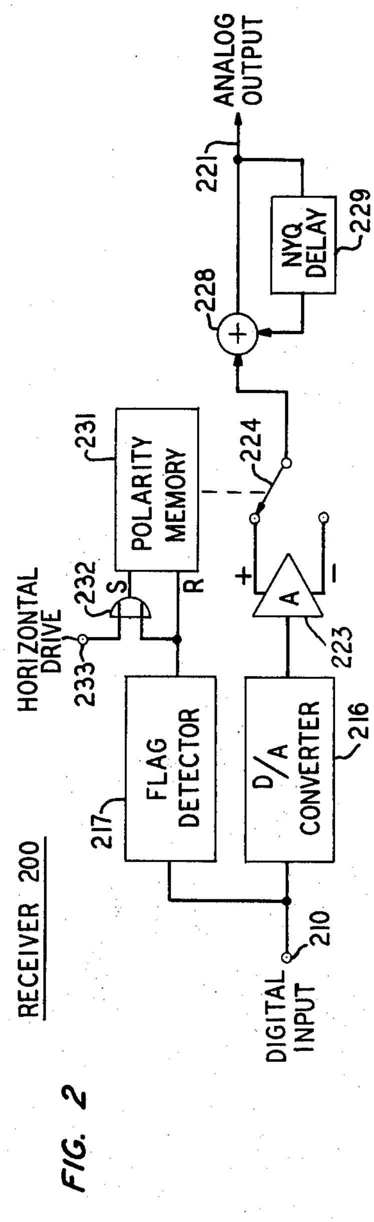
FIG. 2 is a receiver block diagram of the first illustrative embodiment of the present invention.

FIG. 2 is a block diagram of a receiver 200 of the first illustrative embodiment of the present invention. The digital signal of the transmitter 100 of FIG. 1 is obtained from a suitable transmission medium and is applied to an input terminal 210 of the digital receiver 200. The input terminal 210 is connected to a digital-to-analog converter 216 ad a flag detector 217. The more frequently transmitted absolute magnitude words are decoded into analog signal levels by the converter 216 and flag signals produce a zero level output. The flag detector 217, however, responds only to flag words which are transmitted only during changes in polarity. The output signal of the converter 216 is applied to a unity gain amplifier 223. The amplifier 223 has a noninverted output signal and an inverted output signal which are applied to a switch 224. The switch 224 provides either the positive or the negative version of the output of the converter 216. The amplifier 223 and switch 224, along with the adder 228 and the delay 229, are analogous to the components both in construction and function located in the feedback circuit of the transmitter 100 which is used to supply the predicted signal from the transmitted digital output signal.

The flag detector 217 is activated by flag word appearing at the input terminal 210. The output of the flag detector 217 is applied through OR gate 232 to a polarity memory 231 and also directly to memory 231 by a second input. The function of the flag detector 217 is to continuously update the polarity memory 231 which controls switch 224. The OR gate 232 has another input terminal 233 to which is applied a horizontal drive signal obtained from the video format of the input digital signal. The horizontal drive signal maintains synchronization of the polarity memory 231 of the receiver with the polarity memory 131 of the transmitter 100 in FIG. 1. The analog output signal available from terminal 221 is a reconstructed replica of the analog input signal supplied to the input terminal 110 of the transmitter 100.

Figure 3:
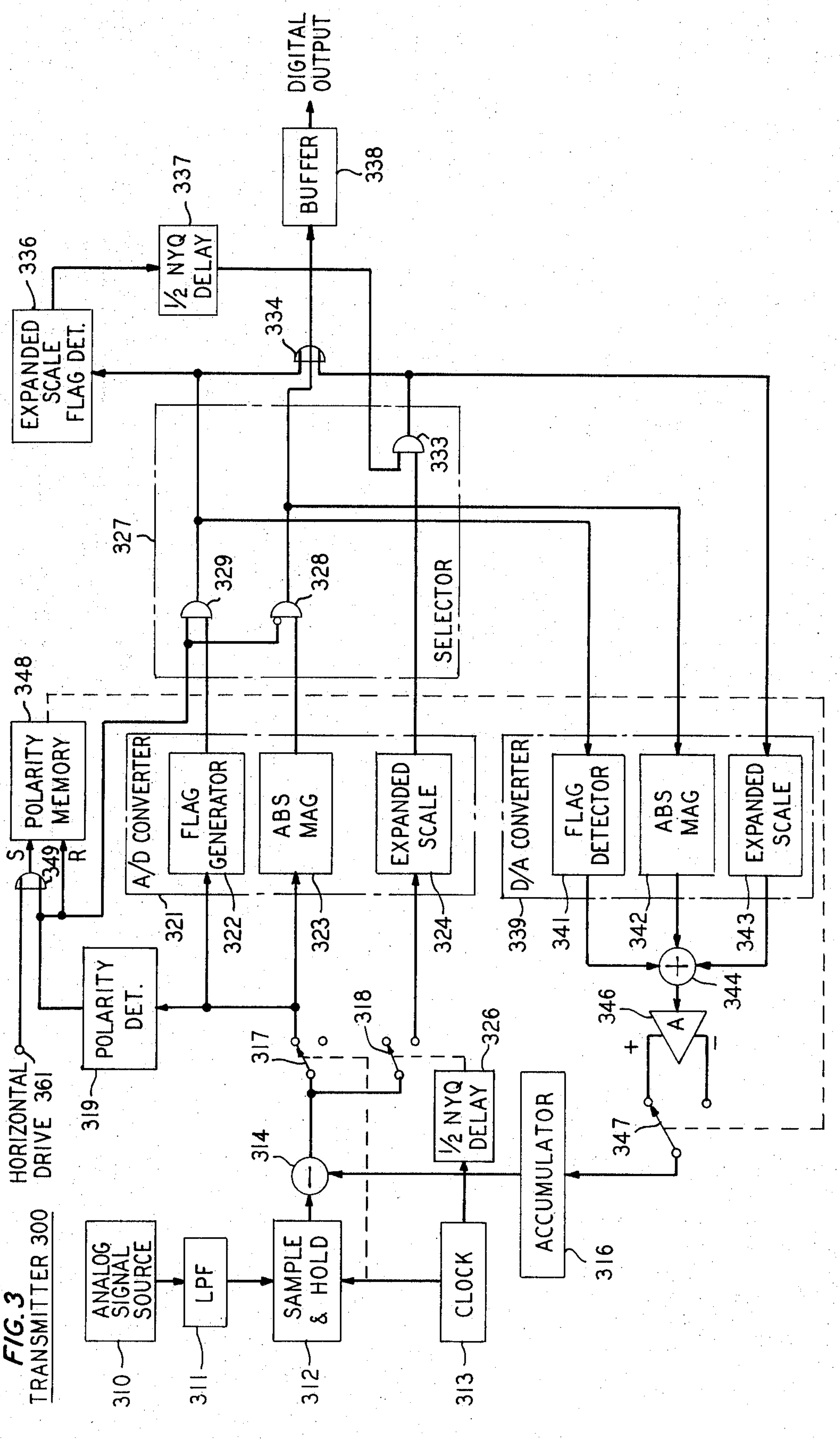
FIG. 3 is a transmitter block diagram of the second illustrative embodiment of the present invention.

FIG. 3 is a block diagram of a transmitter 300 of the second illustrative embodiment of the present invention employing expanded scale mode operation in addition to sign redundancy reduction. The analog input signal representative of a video signal from an analog signal source 310 is filtered by a low pass filter 311, and is applied to a sample and hold circuit 312. A clock 313 runs at the Nyguist rate or frequency that is twice the frequency of the upper cutoff frequency of the low pass filter 311. The sampling rate of the analog signal in the sample and hold circuit 312 is determined by the frequency of the output signal of the clock 313. The sample and hold circuit 312 maintains or holds the level of each sample for the duration of each sampling interval and its output signal is applied to a subtractor 314. A prediction signal from an accumulator 316 is also applied to the subtractor 314. The differential sample output of the subtractor 314 is applied to switches 317 and 318.

The clock 313 controls switches 317 and 318 which make the differential samples available to the remaining circuitry in the transmitter 300. The switch 317 closes at the beginning of each sampling interval and supplies the differential samples to a polarity detector 319 and two of the three sections of an analog-to-digital converter 321. The three sections of the analog-to-digital converter 321 are: a flag generator 322, an absolute magnitude converter 323 and an expanded scale converter 324. The differential samples from the switch 317 are applied to the flag generator 322 and the absolute magnitude converter 323. A one-half of a Nyquist interval delay 326 causes the output of the clock 313 to be delayed such that the switch 318 closes in the middle of each sampling interval. The delayed differential samples are applied to the expanded scale converter 324.

Each section of the analog-to-digital converter 321 performs a different function within the restriction of a three-bit per word code. The flag generator 322 provides either one of two output code words or predetermined combinations which are used as flag signals to signify changes in polarity of the transmitted digital signal. The application of a differential sample of a low amplitude to the flag generator 322 causes a first flag word or signal to be generated. A second flag word is generated if the differential samples exceed a predetermined threshold level. The absolute magnitude converter 323 provides an output signal of six different code words or combinations which are available in the three-bit per word code in which each word is indicative of a quantized input level of a differential sample. The expanded scale converter 324 has an 8-word coded binary output with each word being indicative of a quantized input level of a differential sample on an expanded scale. The flag generator 322 and the absolute magnitude converter 323 provide output code words simultaneously. The expanded scale converter 324 provides a code word output which is delayed by one-half of a sampling interval by the operation of the switch 318. The timing and spacing of the normally transmitted cord words are such that the expanded scale code word will fit between them. The outputs from all three sections of the converter 321 are applied to a selector network 327. Although the operation of the second illustrative embodiment is described in terms of a three-bit per word code, the application of the present invention is not restricted to any particular code and other codes may be used by those skilled in the art.

The operation of the selector network 327 shall be considered on the basis of three classifications of differential samples applied to the converter 321. In all cases, the output signal of the polarity detector 319 controls AND gates 328 and 329. The output signal of an expanded scale flag detector 336 is applied to a delay 337 to keep AND gate 333 disabled except during the operation of the expanded scale mode. The selector network 327 functions to insure that the appropriate signals from the three sections of the converter 321 are transmitted and used to construct the prediction signal. The output signals from AND gates 328, 329 and 333 are all applied to an OR gate 334. The output signal of the OR gate 334 is read into a buffer 338 and then transmitted.

The first classification of differential samples applied to the converter 321 are differential samples that have the same sign as the previous differential sample. This classification of differential samples occurs most frequently and requires the absolute magnitude converter 323 to provide a digital signal to describe the amplitude of the samples for transmission. The output signal of polarity detector 319 causes AND gate 328 to be enabled and AND gate 329 to be disabled. Thus, the output signal of the absolute magnitude converter 323 is supplied for the prediction signal and transmitted through AND gate 328. Under this condition, the output signal of the flag generator 322 is gated off to prevent interference with the prediction signal.

The second classification of differential samples are differential samples that have changed in sign from the previous differential sample and have a low amplitude level. These differential samples cause the flag generator 322 to produce a first flag signal indicative of a change in polarity between differential samples. The polarity detector 319 also detects the change and its output signal disables AND gate 328 to gate off the absolute magnitude signal and enables AND gate 329 to provide a signal for the construction of the prediction signal. Under this condition, the first flag signal is transmitted and also used for the prediction signal through AND gate 329.

The third classification of differential samples are differential samples that are changed in sign and are accompanied by a high amplitude level. This classification of differential samples causes the flag generator 322 to generate a second flag word indicative of signal characteristics of this classification. The polarity detector 319 also detects the change in polarity and causes AND gate 328 to be disabled and AND gate 329 to be enabled. The second flag signal is transmitted and used to furnish the prediction signal the same as the first flag signal was during the occurrence of the second classification of differential samples. Under the third classification, however, the output signal of the expanded scale flag detector 336, delayed by the delay 37, causes AND gate 333 to be enabled one-half of a sampling interval later. At this time, the switch 318 is closed to apply the signal to the expanded scale converter 324. The output signal from the expanded scale converter 324 is applied to AND gate 333 which is enabled to allow transmission of the expanded scale amplitude word used to describe the amplitude of the third classification of differential samples. The output signal from the AND gate 333 is also used to furnish the prediction signal. The output signal of the AND gate 333 is placed between regularly spaced code words read into the buffer 338. The buffer 338 operates to regulate the transmission rate of the code words. The buffer 338 also causes the transmission signal to extend into the horizontal retrace interval.

A digital-to-analog converter 339 is divided into three sections to provide a prediction signal for each of the three types of signals transmitted. The three sections of the converter 339 are the flag detector 341, the absolute magnitude converter 342, and the expanded scale converter 343. As previously discussed, the selector network 327 provides the appropriate input signal to each of these sections. The output of the adder 344, which is merely the sum of the analog signals from the converter 339, is applied to a unity gain amplifier 346. The amplifier 346 has a noninverted output and an inverted output which are applied to a switch 347. The polarity memory 348 controls the switch 347 to supply the correct polarity signal for the accumulator 316. The output signal of the accumulator 316 is the prediction signal which is supplied to the subtractor 314.

Figure 4:
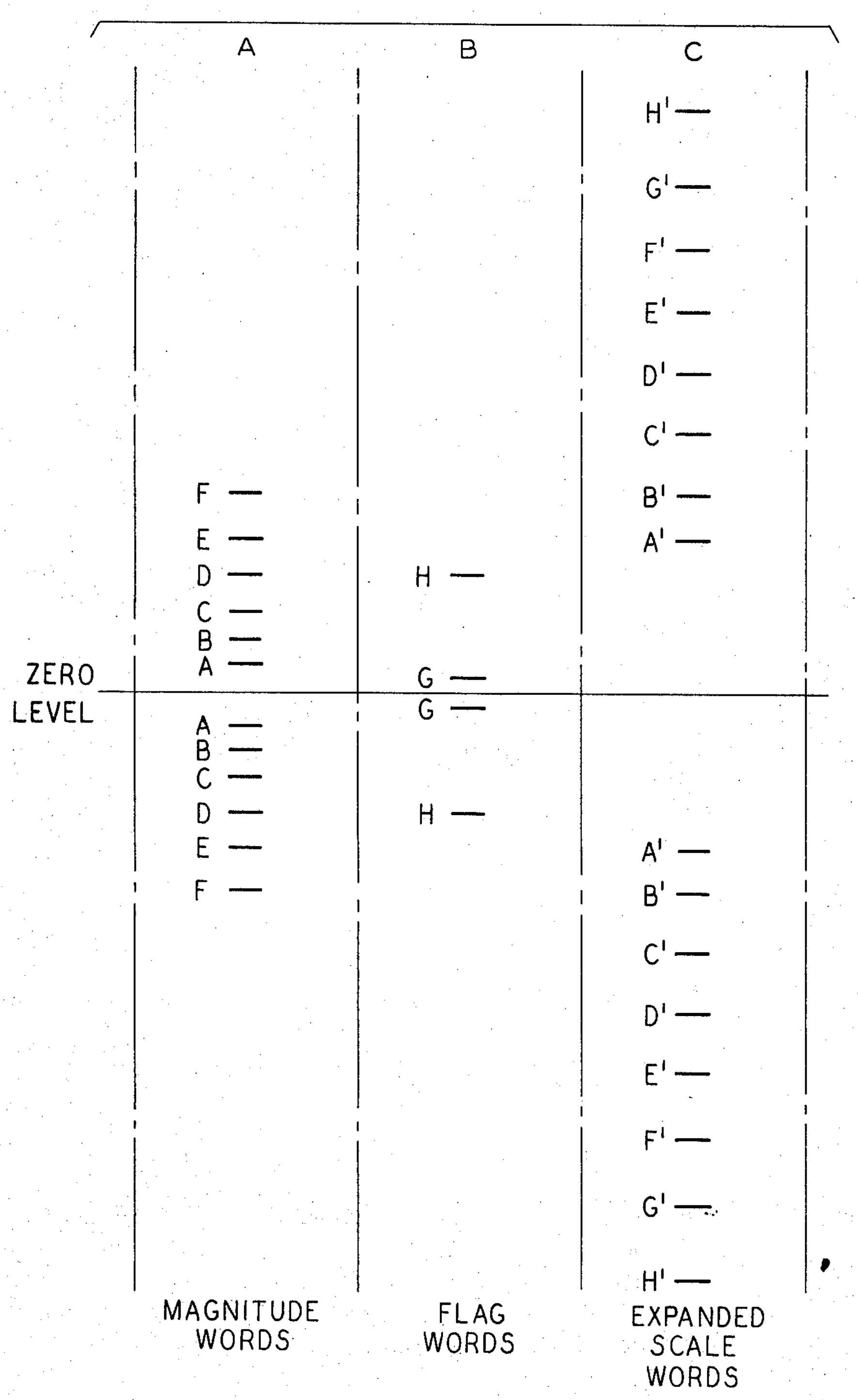
FIG. 4 is a chart showing the effective quantizing levels that may be obtained through the use of the expanded scale coding technique employed in FIG. 3.

The operation of the transmitter 300 in FIG. 3 can be ascertained more clearly through a description of FIG. 4. FIG. 4 shows a relative arrangement of the effective quantizing levels employed by the present invention. Section A depicts the quantizing levels provided by the absolute magnitude converter 323 between changes in sign of the differential samples. Each level corresponds to a digital word which may depict either a positive or a negative signal determined by the polarity memory 348 which maintains a record of the polarity of the transmitted absolute magnitude words. Section B depicts the flag word signals provided by the flag generator 322 upon the occurrence of a change in polarity between differential samples. If the sign-changed sample is accompanied by a low amplitude, a first flag signal or G word is transmitted to signify a change in polarity. If the sign-changed sample is accompanied by a high amplitude, a second flag signal or H word is transmitted to signify a change in polarity to be followed by an expanded scale word used to describe the high amplitude value. Section C depicts the expanded scale words provided by the expanded scale converter 324. The operation of delays 326 and 337, respectively, insures the simultaneous operation of the converter 324 and transmission of the expanded scale word between two regularly spaced code words.

Figure 5:
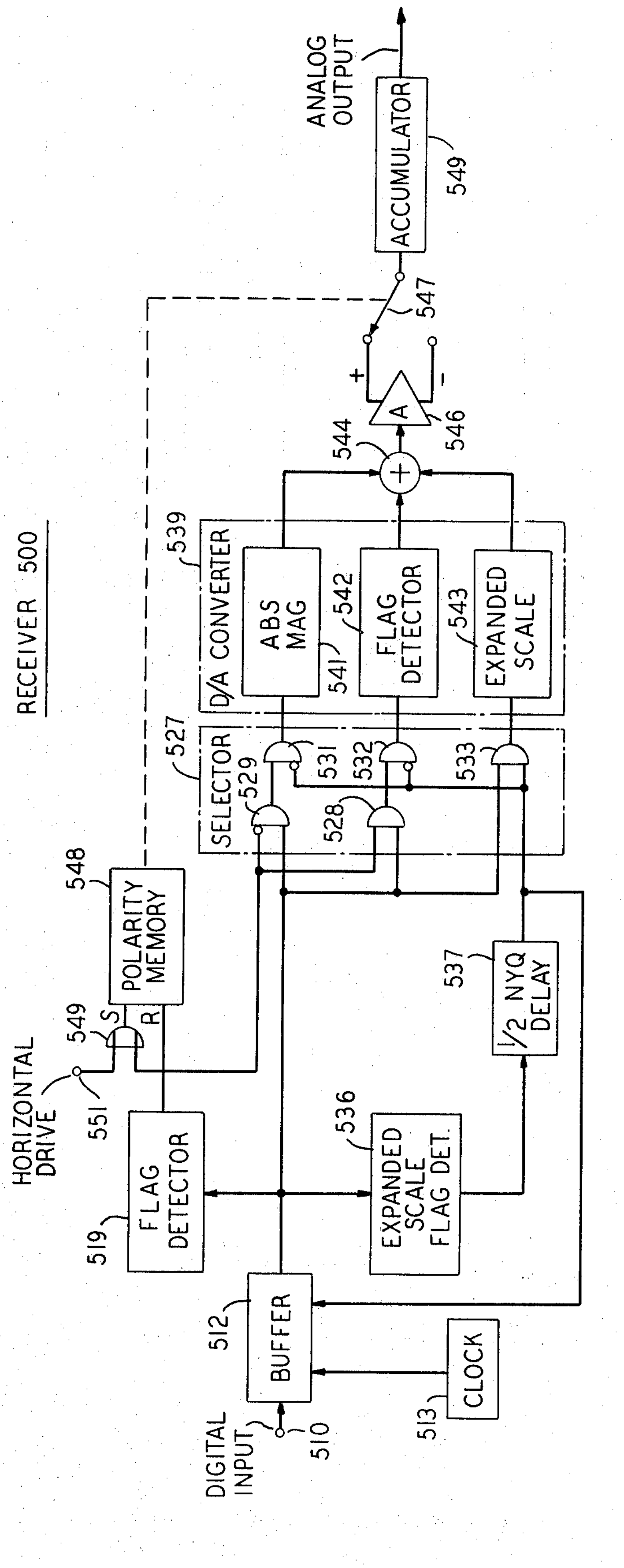
FIG. 5 is a receiver block diagram of the second illustrative embodiment of the present invention.

FIG. 5 is a receiver block diagram 500 of the second illustrative embodiment of the present invention. The digital signal from a suitable medium is applied to a terminal 510 of a buffer 512. The buffer 512 functions as an elastic storage device controlled by a clock 513 which runs at the Nyquist frequency. The output signal of the buffer 512 is applied to a flag detector 519, a selector network 527 and an expanded scale flag detector 536. The output signal of the flag detector 519 updates the polarity memory 548 in accordance with the detection of either of the two flag signals. A horizontal drive signal applied to a terminal 551 of an OR gate 549 synchronizes the polarity memory 548 in the set state. The output of the flag detector 519 also controls AND gates 528 and 529 in the selector network 527. The application of the second flag signal to the expanded scale flag detector 536 provides an output signal. The output signal of the expanded scale flag detector 536 controls AND gates 531, 532 and 533 of the selector network 527 through a delay 537. The delayed output is also applied to the buffer 512. The outputs of AND gates 531, 532 and 533 are respectively applied to an absolute magnitude converter 541, a flag detector 542 and an expanded scale converter 543 which are sections of a digital-to-analog converter 539.

After the arrival of an absolute magnitude word at the terminal 510, the buffer 512 will transfer the absolute magnitude word to the selector network 527. In the absence of flag signals, the output signal of the flag detector 519 is at a level which will disable AND gate 528 and enable AND gate 529. Likewise, the output signal of the expanded scale flag detector 536 is at a level which will enable AND gates 531 and 532 while disabling AND gate 533. Thus, the absolute magnitude word is applied to the absolute magnitude converter 541 through AND gates 529 and 531 which are the only enabled gates. The output signal of the absolute magnitude converter 541 is an analog signal which is applied to an adder 544.

Subsequent to the presence of a first flag word at the terminal 510, the buffer 512 transmits the first flag word to the flag detector 519. The flag detector 519 responds to the flag signal and provides an output which updates the polarity memory 548, enables AND gate 528, and disables AND gate 529. In the absence of the second flag word, the output of the expanded scale flag detector 536 enables AND gates 531 and 532, and disables AND gate 533. Thus, the first flag word is transmitted through AND gates 528 and 532 to the flag detector 542. The output of the flag detector 542 is a zero level signal which is applied to the adder 544.

When the output of the buffer 512 is a second flag word, the flag detector 519 detects the second flag word and provides an output that updates the memory 548, enables AND gate 528, and disables AND gate 529. The expanded scale flag detector 536 detects the second flag word and provides an output signal which is delayed one-half of a Nyquist interval by the delay 537. The delayed output signal causes AND gates 531 and 532 to be disabled while AND gate 533 is enabled. The delayed output signal is also applied to the buffer 512 to provide for the release of the next word which is an expanded scale word. The expanded scale word is applied to the expanded scale converter 543 via the only enabled AND gate 533. The expanded scale converter 543 produces an analog signal of an amplitude which corresponds to the decoded expanded an amplitude which corresponds to the decoded expanded scale word. This output is applied to the adder 544.

The output signal of the adder 544 is applied to a unity gain amplifier 546. The amplifier 546 has a non-inverted and an inverted output which are connected to a switch 547. The switch 547 selects the appropriate polarity signal from the amplifier 546 under the control of the output signal of the polarity memory 548. An accumulator 549 sums the analog signal to produce a replica of the input analog signal to the transmitter 300 shown as a block diagram in FIG. 3.

In all cases it is to be understood that the foregoing described arrangements are merely illustrative of a small number of the many possible applications of the principles of the invention. Numerous and varied other modifications of pulse code communication systems in accordance with these principles may readily be devised by those skilled in the art without departing from the spirit and scope of the invention.

What is claimed is:

1. A digital transmission system comprising:

a source of analog signals;

means for obtaining regularly recurring differential samples of the analog signals;

first encoding means for encoding and transmitting signals indicative of the absolute magnitude of the differential samples;

signaling means for supplying a predetermined digital signal indicative of sign changes between differential samples; and means for interrupting the transmission of the output of said first encoding means upon the occurrence of a change in polarity between the differential samples comprising second means providing a signal indicative of a change in sign between differential samples, and gating means responsive to the output signal of said second means connected to said signaling means and said first encoding means for inhibiting the transmission of the output of said first encoding means and for transmitting the predetermined signal from said signaling means upon the occurrence of a sign change between differential samples.

2. The digital transmission system of claim 1 wherein said means for obtaining differential samples comprises:

decoding means for providing discrete analog signal levels indicative of the absolute magnitude of the differential samples applied to said first encoding means;

means for producing both a positive and a negative version of the analog signal levels comprising amplifying means connected to the output of said decoding means;

memory means connected to the output of said second means and having two states for indicating the polarity of the output from said first encoding means for controlling switching means for selecting the proper polarity from the two signals of opposite polarity from said amplifying means;

accumulating means for summing the discrete analog signal levels; and subtracting means for obtaining differential samples by taking the difference between the sampled analog signal and the output of said accumulating means.

3. A digital transmission system comprising:

a source of digital signals including digital signals indicative of the absolute magnitude of differential samples of an analog signal and a predetermined digital signal indicative of a change in sign between the differential samples;

first means for decoding the absolute magnitude digital signals into discrete amplitude levels;

second means for providing an output signal indicative of the occurrence of the predetermined digital signal;

amplifying means having an inverted and a noninverted output for supplying two polarities of the discrete amplitudes levels of said first means;

memory means connected to the output of said second means for maintaining a state indicative of the polarity of the absolute magnitude differential signals;

switching means controlled by said memory means connected to the outputs of said amplifying means for selecting the output signal with the polarity indicative of the state of said memory means; and accumulating means connected to said switching means for summing the selected output signal levels of said amplifying means to provide a replica of the analog signal represented by the digital signals.

4. A digital transmission system comprising:

a source of analog signals;

means for obtaining regularly recurring differential signals of the analog signals;

first means for encoding the quantized absolute magnitude of the differential samples;

second means for providing one of two predetermined signals in response to each differential sample; the first predetermined signal being indicative of a low magnitude level and the second predetermined signal being indicative of a high magnitude level for each differential sample that is changed in sign;

third means for encoding the absolute magnitude of delayed differential samples into expanded scale signals having quantizing levels that exceed said first means; and transmitting means for selecting between the encoded signals from said first means and the predetermined signals from said second means comprising fourth means for detecting a sign change between differential samples and providing an output signal indicative of a change in sign; gating means connected to the outputs of said first, second, and third means for inhibiting the transmission of the output of said first means for transmitting the first output signal of said second means in response to the output of said fourth means upon the occurrence of a sign change between differential samples; and fifth means for detecting the second predetermined signal upon the occurrence of a change in polarity detected by said fourth means for enabling said gating means to allow the transmission of an expanded scale signal from said third means.

5. The digital transmission system of claim 4 wherein said means for obtaining differential samples comprises:

sixth means connected to said gating means for decoding the absolute magnitude digital signals into discrete amplitude levels;

seventh means connected to said gating means for decoding the two predetermined flag signals into a zero level signal;

eighth means connected to said gating means for decoding the expanded scale signals into discrete amplitude levels;

adding means for summing the outputs of said sixth, seventh and eighth means;

means for producing both a positive and a negative version of the analog signal levels comprising amplifying means connected to the output of said adding means;

memory means connected to the output of said fourth means and having two states for indicating the polarity of the output from said first means for controlling switching means for selecting the proper polarity from the two signals of opposite polarity from said amplifying means;

accumulating means for summing the discrete analog signal levels; and subtracting means for obtaining the differential samples by taking the difference between the sampled analog signal and the output of said accumulating means.

6. A digital transmission system comprising:

a source of digital signals, which signals include first and second flag signals indicative of polarity changes in a differentially sampled analog signal, absolute magnitude and expanded scale signals indicative of the absolute magnitude of the differential samples;

first means for detecting the first and second flag signals;

second means for detecting the second flag signal;

gating means responsive to said first and second means for sorting out the digital signals into three groups to be applied to decoding means;

memory means connected to the output of said first means for maintaining a state indicative of the polarity of the digital signals;

said decoding means comprising means for decoding absolute magnitude digital signals, means for detecting first and second flag signals, and means for decoding expanded scale signals, the output of said decoding means being added before being applied to amplifying means having an inverted and a noninverted output;

switching means controlled by the state of said memory means for selecting either the inverted or noninverted output of said amplifying means; and accumulating means for summing the output of said switching means to construct an analog signal represented by the digital signals.

* * * * *